United States Patent [19]

Mehl

[11] 4,443,508
[45] Apr. 17, 1984

[54] EDGE PROTECTOR

[75] Inventor: Donald N. Mehl, Minnetonka, Minn.

[73] Assignee: Norfab, Inc., Minneapolis, Minn.

[21] Appl. No.: 431,617

[22] Filed: Sep. 30, 1982

[51] Int. Cl.³ .......................... B60R 13/04; B32B 3/04
[52] U.S. Cl. .................................... 428/122; 428/182;
428/192; 428/217; 49/462; 52/716
[58] Field of Search .............. 428/122, 217, 182, 192,
428/126; 49/462, 490; 52/716

[56] References Cited

U.S. PATENT DOCUMENTS 1,680,315  8/1928  Bailey ................................... 428/122
3,685,231  8/1972  Blose ..................................... 52/716

Primary Examiner—Alexander S. Thomas
Attorney, Agent, or Firm—James R. Haller

[57] ABSTRACT

An edge protector for a sheet of glass or the like comprising an integral, dual-durometer, co-extruded channel having rigid and soft portions. The rigid portion comprises a channel having an internally generally flat central portion and legs extending convergently from edges of the central portion and terminating in reversely curved, divergent edge portions providing confronting oppositely curved surfaces spaced from the central portion. The soft portion comprises deformable gripping pads formed integrally by co-extrusion on said confronting surfaces and providing confronting, deformable gripping surfaces for conformably gripping therebetween, with surface-to-surface contact, exterior parallel surfaces of a glass sheet or the like adjacent the edge of the sheet with the latter receivable in confronting relationship to the internally generally flat central portion of the protector.

5 Claims, 4 Drawing Figures

U.S. Patent  Apr. 17, 1984  4,443,508
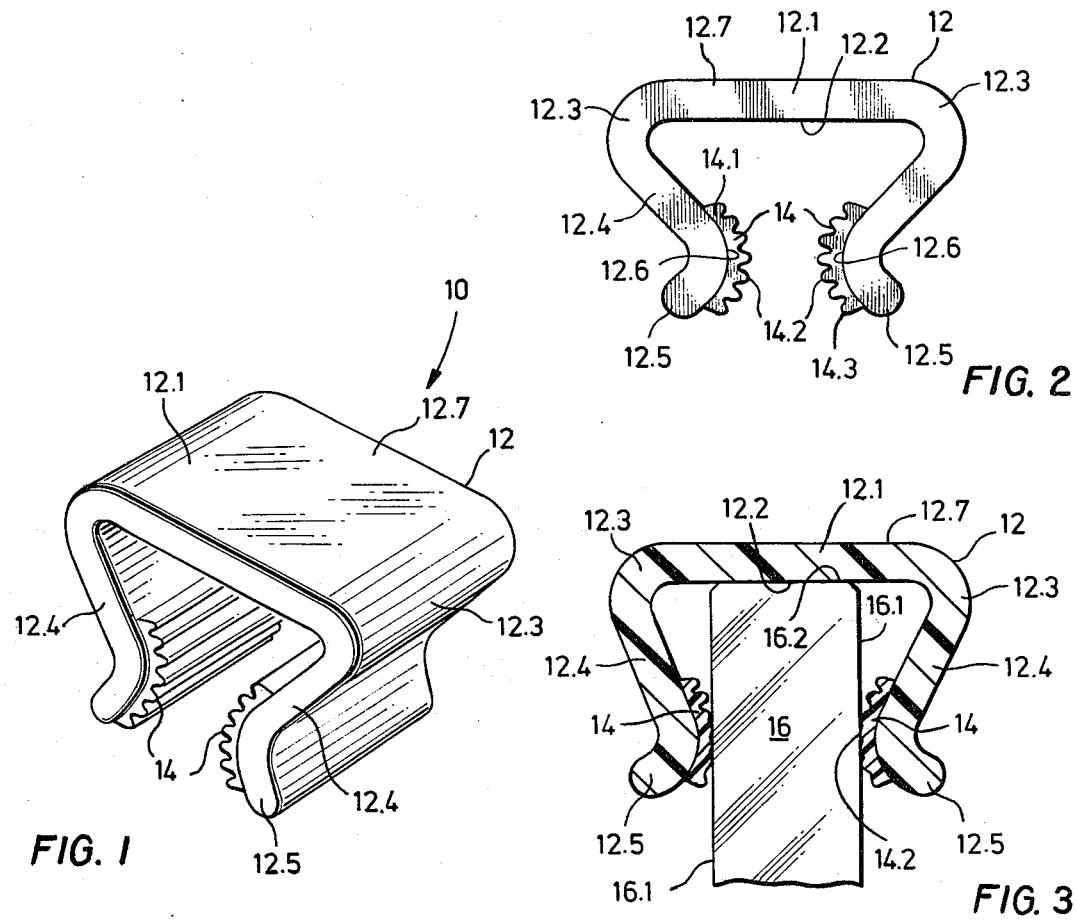
FIG. 1
FIG. 2
FIG. 3
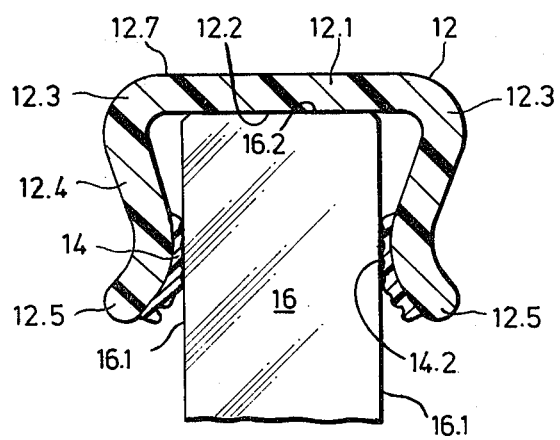
FIG. 4

EDGE PROTECTOR

BACKGROUND OF THE INVENTION

It is often necessary to protect the edges of glass panes and the like when the same are used, for example, as sliding doors or windows or are to be stored vertically upon hard surfaces. Such protectors particularly may function as guides which slide upon the metal guide frames of a cabinet or the like as the sliding doors to which they are attached are opened and closed.

Such protectors have for the most part been made of metal or plastic having a generally "u"-shaped cross-sectional configuration. One such device, made of a vinyl plastic material, has employed co-extruded longitudinal fingers for gripping the opposed surfaces of a glass pane near its edge. Such prior devices, however, have commonly been difficult to install or remove from the edge of a glass sheet, and moreover have individually been designed to fit only a given sheet thickness.

An edge protector or guide having improved gripping characteristics and being capable of use for different thicknesses of glass panes or the like leaves much to be desired.

SUMMARY OF THE INVENTION

The present invention provides a protector mountable to the edge of a glass pane or the like, which grips strongly to the periphery of the pane, and which can accommodate a variety of pane thicknesses. The protector comprises an integral, dual-durometer co-extruded channel having comparatively rigid and soft portions. The rigid portion comprises a channel having an internally generally flat central portion and legs extending convergently from the edges of the central portion. The legs terminate in reversly curved edge portions providing confronting, opposed curved surfaces spaced from the central portion. The soft portion comprises deformable gripping pads formed integrally by co-extrusion on the confronting surfaces of the legs and providing confronting, deformable gripping surfaces for conformably gripping therebetween, with surface-to-surface contact, exterior, parallel surfaces of a glass sheet or the like adjacent its edge with the latter receivable in confronting relationship to the internally generally flat central portion of the protector.

Desirably, the rigid portion of the protector is so configured as to provide the legs with a range of elastic movement toward and away from one another. The gripping pads desirably are formed with oppositely curved, generally cylindrical gripping surfaces so as to continuously provide thusly-durved proximate surfaces to parallel surfaces of a glass sheet or the like as the legs are moved together and apart.

DESCRIPTION OF THE DRAWING

FIG. 1 is a perspective view of a protector of the invention;

FIG. 2 is an end view of the protector shown in FIG. 1;

FIG. 3 is a cross-sectional view of the protector of FIG. 1, mounted upon the edge of a pane of glass; and FIG. 4 is a view similar to that of FIG. 3 but showing the protector of FIG. 1 mounted upon the edge of a thicker pane of glass.

DESCRIPTION OF THE PREFERRED EMBODIMENT

A protector of the invention is shown in FIG. 1 generally as (10) and includes a generally rigid channel portion (12) and a softer, gripping pad portion (14). The device is adapted to fit over the edge of a glass pane or the like, designated (16) in FIGS. 3 and 4, to protect the edge of the pane from damage and to provide the edge of the pane with a guide that can slide easily within a guide frame at the edge of a cabinet frame or the like.

The rigid channel portion (12) is generally $\Omega$-shaped in cross-section, the channel having a central portion (12.1) provided with a generally flat interior surface (12.2). Extending from edges (12.3) of the central portion are legs (12.4), the legs converging inwardly desirably symmetrically with respect to one another. The legs terminate outwardly in reversly curved, that is, divergently curved, ends (12.5) providing the legs with confronting, gently curved surfaces (12.6) (FIG. 2) spaced from the central portion (12.1).

The rigid portion of the channel is so configured as to permit the legs (12.4) to be moved elastically toward and away from one another. Such configuration may involve the thickness of the material—generally a vinyl plastic, or the rigid portion may be provided with longitudinal grooves or longitudinal sections of lesser thickness or the like to provide the desired elastic, springy character.

The soft portion (14) of the protector comprises resilient, deformable gripping pads (14.1) formed integrally on the oppositely curved, confronting surfaces (12.6) of the legs by co-extrusion, the gripping pads providing confronting, deformable gripping surfaces (14.2) (FIG. 2) for conforming to and gripping with surface-to-surface contact the exterior parallel surfaces (16.1) of a glass sheet (16) or the like adjacent its edge (16.2). The confronting, gripping surfaces (14.2) of the pads are provided, desirably, with longitudinal, rounded ribs (14.3), but the surfaces (14.2) in general are gently rounded and are generally cylindrical in shape, conforming to the rounded surfaces (12.6) of the legs upon which the pads are carried.

As will be understood from FIGS. 2–4 of the drawings, the legs (12.4) may be elastically spread apart to accommodate between them glass panes (16) having different thicknesses, the pads (14) continuously providing generally cylindrically curved, proximate surfaces to the opposed, parallel surfaces (16.1) of the panes. Being deformable, the pads hence engage the glass surfaces (16.1) in surface-to-surface contact, as shown in FIGS. 3 and 4.

In FIG. 3, a thin glass pane of e.g., about $\frac{1}{8}$" in thickness is received between the pads (14), and the lower portions of the pads squeeze against and conform to the opposed, parallel surfaces of the glass pane to hold the pane tightly between the legs (12.4). In FIG. 4, a glass pane of greater thickness, e.g., up to perhaps $\frac{1}{4}$" in thickness, has been inserted between the legs. To accommodate the greater thickness, the legs (12.4) are spread further apart, and in this event, the upper portion of the pads (14) bear against and conform to the opposed surfaces of the glass pane. Thus, because of the convergence of the legs to permit them to spread apart, and because of the oppositely curved gripping surfaces of the gripping pads carried by curved surfaces of the legs, contact of a significant portion of the pads against opposed, parallel surfaces of a glass pane is assured.

It is desired that the outer surface (12.7) of the central portion of the protector be smooth and desirably slippery so that the same may slide easily along the metal, plastic or wooden tracks of a cabinet within which a glass pane is slideably associated.

The protector of the invention is made by a co-extrusion technique known to the art in which polymeric materials having different degrees of softness are extruded together through a die to form a solid extrusion. The polymeric material preferably is a vinyl polymer such as poly vinylchloride, suitably filled and plasticized in a known manner to give the desired ridigity and softness to the coextruded portions. The bond that is formed between the soft portion (14) and more rigid portion (12) of the protector of the invention does not employ a separate adhesive, but rather is the bond that results when the rigid and soft polymeric materials are melted and flowed together through an appropriate die. The protector may be manufactured as a continuous extrusion which later is severed into portions of a desired length.

In a preferred embodiment, the thickness of the rigid portion (12) is reasonably uniform, and the elastic or springy nature of the resulting channel is due to appropriate selection of the polymeric materials that are employed, the thickness of the channel walls and the radius of the curved intersection of the legs with the central portion of the channel. In one embodiment, which can accept panes of glass ranging from about ⅛th of an inch up to about ¼th of an inch in thickness, the channel may be made of filled, plasticized poly vinylchloride having a uniform wall thickness of about 0.062 inches with the pads being made of a far more resilient poly vinylchloride material having a thickness on the order of 0.03 inches.

It will be noted that the pads desirably extend from adjacent the ends of the legs (12.4) around the curved surface of the legs and onto the convergent leg portions. It will also be noted that the inner surface (12.2) of the rigid channel is generally flat so as to accommodate the usually generally flat edges (16.2) of panes of glass or the like. The outwardly flared or diverging ends of the legs also serve as guides to permit the ready insertion of the edge of a plate between the legs.

It will be understood that the protector of the invention, although it is described primarily with reference to glass plates, may be used with substantially any plate-like material the edges of which are to be protected, supported or guided.

While a preferred embodiment of the present invention has been described, it should be understood that various changes, adaptations and modifications may be made therein without departing from the spirit of the invention and the scope of the appended claims.

What is claimed is:

1. An edge protector for a sheet of glass or the like comprising an integral, dual-durometer, co-extruded channel having rigid and soft portions, the rigid portion comprising a channel having an internally generally flat central portion and legs extending convergently from edges of the central portion and terminating in reversely curved, divergent edge portions providing confronting oppositely curved surfaces spaced from the central portion, the soft portion comprising deformable gripping pads formed integrally by co-extrusion on said confronting surfaces and providing confronting, deformable gripping surfaces for conformably gripping therebetween, with surface-to-surface contact, exterior parallel surfaces of a glass sheet or the like adjacent the edge of the sheet with the latter receivable in confronting relationship to the internally generally flat central portion of the protector.

2. The edge protector of claim 1 wherein the rigid portion is so configured as to provide the legs with a range of elastic movement toward and away from one another and wherein the gripping surfaces of the gripping pads are formed with oppositely curved, generally cylindrical gripping surfaces so as to continually provide thusly-curved proximate deformable gripping surfaces to parallel surfaces of a glass sheet or the like adjacent its edge as the legs are moved together and apart.

3. The edge protector of claim 2 in which said generally cylindrically curved gripping surfaces of the gripping pads are provided with longitudinally extending ribs.

4. The edge protector of claims 1 or 2 in which the legs and central portion of the rigid channel are of uniform thickness.

5. The edge protector of claim 1 in which the central portion includes a smooth exterior surface.

* * * * *